United States Patent [19]
Gabor

[11] 3,745,814
[45] July 17, 1973

[54] SONORADIOGRAPHY SYSTEM

[75] Inventor: Dennis Gabor, Stamford, Conn.

[73] Assignee: Columbia Broadcasting System, Inc., New York, N.Y.

[22] Filed: Sept. 13, 1971

[21] Appl. No.: 179,915

[52] U.S. Cl. ............................. 73/67.5 H, 340/5 H
[51] Int. Cl. .......................................... G01n 29/04
[58] Field of Search ................. 73/67.5 H; 340/5 H; 350/3.5

[56] References Cited
UNITED STATES PATENTS
3,594,717  7/1971  Macouski ................. 73/67.5 HA X OTHER PUBLICATIONS
A. F. Metherell et al., Temporal Reference Acoustical Holography, Applied Optics, August 1969, pp. 1543-1550.

Primary Examiner—Richard C. Queisser
Assistant Examiner—John P. Beauchamp
Attorney—Spencer E. Olson

[57] ABSTRACT

A system for probing a body with ultrasonic radiation and for converting the resulting radiation pattern into a visually perceptible image through the interaction of the ultrasonic radiation and coherent light at a reflecting membrane. To provide sufficient reflection at the interface for optical detection, a short, sharp pressure impulse is directed through a fluid medium to the body under investigation where its interaction produces ultrasound waves that cause deformations of the membrane. Modulated, coherent light is directed toward the membrane interface to produce the appearance of Fresnel zones on the membrane from the ultrasound waves which strike it. Light reflected from the membrane is received by a camera which produces a photographic exposure that can be later viewed by holographic techniques. Small deformations of the membrane are made visible by a schlieren stop which is made highly efficient by a correcting hologram that compensates for imperfections in the shape of the membrane.

6 Claims, 15 Drawing Figures

# 3,745,814

SONORADIOGRAPHY SYSTEM

FIELD OF THE INVENTION

This invention relates to sonoradiography, and more particularly to a system and method for producing an optical (visible) image representing the internal structure of a body examined by ultrasonic radiation.

BACKGROUND OF THE INVENTION

An ultrasonic camera was first proposed by S. Y. Sokoloff in the early 1930's, and until recently workers in the field have essentially followed his method. The Sokoloff camera basically is an electron camera having a piezoelectric target, submerged in a fluid. The piezoelectric crystal plates, which are attached to the vacuum envelope of the camera, translate the ultrasonic vibrations into electric potential which act on a scanning electron beam, the response of which is ultimately displayed on the screen of a cathode ray tube. This technique has enjoyed some success for the detection of flaws in metal specimens, for example, but has fallen far short of the principal aim of ultrasonic cameras, namely, to provide an alternative to x-rays, in particular in the diagnosis of pregnancies, free from the dangers attending x-rays. The Sokoloff camera had to be made small, as the thin envelope had to withstand the full air-vacuum pressure, and even with a thin envelope, the screen could not be matched to water, but reflected most of the ultra-sound energy.

Recognizing the shortcomings of the Sokoloff ultrasonic camera, it has long been a wish of investigators in the field of ultrasonic imaging to make sound fields visible by the deformation of a membrane, which is so thin that it follows the motion of the water. Heretofore, this was always frustrated by the insensitivity of the method; water is acoustically so hard that the amplitudes of the ultrasonic frequencies (1–10 MHz) which are sent back by a body in medical sonography are only on the order of Angstroms. Although hydrophones are capable of recording such signals, such a great number of them would be required to cover the area of the membrane that this solution is not readily practicable within the current state of the art. On the other hand, for optical observations of the deformations of the membrane, a gap of detectability of at least six orders of magnitude must be bridged. Amplitudes which one can record optically by means heretofore proposed require such high energies that transducers cannot produce them without cavitation, and even if one could produce sound power of the necessary levels, living organisms could not withstand it.

In order to see small deformations of a membrane schlieren methods have been used or proposed; that is to say, covering up by a "schlieren stop" the light reflected by the undeformed membrane, so that only the deformations become visible. However, this method operates well only with optically perfect spherical (or plane) mirrors; a thin membrane under water cannot be expected to take up an optically perfect shape, especially not if there is a living body near to it in the water.

Another deficiency in prior art systems has been the use of ultrasonic pulses with alternating tension and compression (pressure), which tend to disrupt complex molecules by the tension component at the high powers required for acceptably detectable visualization.

BRIEF SUMMARY OF THE INVENTION

The foregoing and other deficiencies of the prior art are overcome in accordance with the present inventon by effecting insonification by a short, sharp pressure wave, rather than by ultrasonic oscillators, as has always been done in the past. The imaging imperfections caused by the imperfect membrane are overcome by taking a correcting hologram, preferably immediately before the sound exposure, which serves to convert the membrane into a perfect spherical mirror. The combination of correcting hologram and imperfect mirror produce a very fine point focus, which can be covered up by a very small schlieren stop. The schlieren stop is preferably also produced in a photochromic emulsion just before the sound exposure. Further improvement in sensitivity is achieved by superposing a light pattern on the illuminating wave which makes it appear as if there were a "reference wave" on the screen having a peak-to-peak amplitude of a quarter wavelength. The schlieren method, because it is quadratic, is not favorable for small amplitudes, but when a quarter wave bias is added to it, the sensitivity (in terms of power) is improved several hundred times. Corrugating the membrane with λ/4 peak-to-peak would require impossibly large sound powers; in accordance with the invention, the wavefront, instead of the membrane, is "crinkled". The effect is the same, except that the peak-to-peak phase difference in the wave must be λ/2 rather than λ/4.

BRIEF DESCRIPTION OF THE DRAWINGS

Other objects and features of the invention will become evident, and its construction and operation better understood, from the following detailed description, taken in conjunction with the accompanying drawings, in which.

DESCRIPTION OF THE PREFERRED EMBODIMENTS

The present invention provides a practical system for obtaining an optical (visible) image representing the internal structure of a body examined by ultrasonic radiations. The body is probed with a short, sharp pressure-pulse wave incident onto the body through a membrane. The echos of the pulse produced by interaction with the internal structure of the body again pass through the membrane, in the form of a spherical pulse wave for each reflecting point in the body. The echo waves deform the membrane in successive perturbations as they pass through it. These deformations are made visible by directing a regularly pulsed beam of coherent light onto the membrane, the pulsations serving to momentarily "freeze" the successive deformations of the membrane caused by the traversing pressure wavelets in the form of a Fresnel zone plate for each elementary spherical pulse wavelet. A photographic exposure of the surface of the membrane is made through a schlieren stop and correcting hologram throughout the period that echoes traverse the membrane. The resulting photograph is a hologram which represents an optical visualization of the pulse-echo wave field. An image of the internal structure of the body may be extracted from the hologram by holographic techniques.

Figure 1:
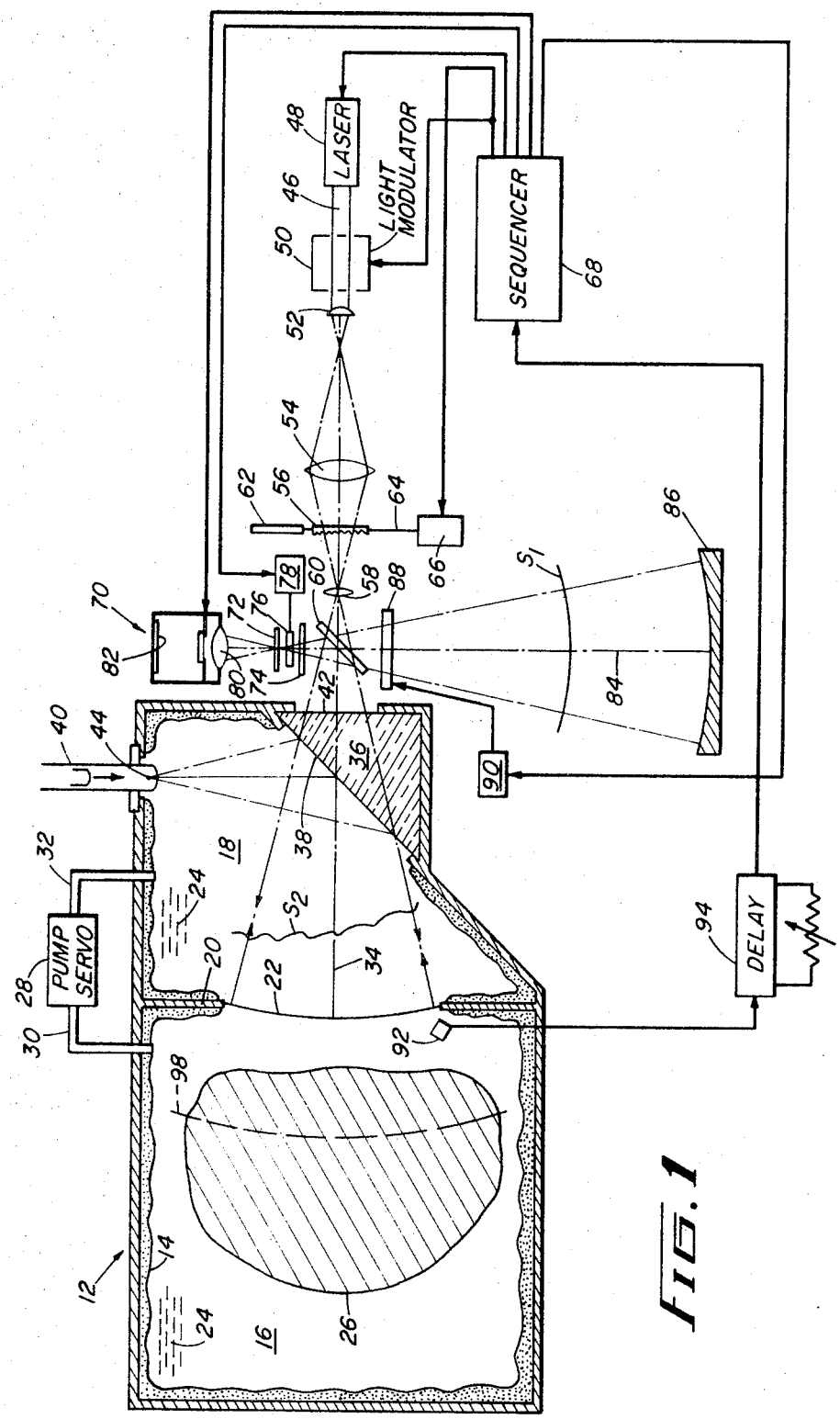
FIG. 1 is a diagrammatic and sectional presentation of a sonoradiography system according to the invention.

More particularly, and with reference to FIG. 1, the system includes a chamber 12 having sound absorbing material 14 covering its interior walls. The chamber is separated into two portions 16 and 18 by a diaphragm constriction 20 and a thin membrane 22 stretched across and completely covering a central circular opening in the diaphragm 20. Both portions of the chamber 12 are filled with the same liquid medium 24, and the body 26 to be investigated is immersed in the liquid in the chamber portion 16. The liquid may be water, and a fluid pump servomechanism 28, connected through conduits 30 and 32 to chamber portions 16 and 18, respectively, is operative to maintain a predetermined pressure differential between the two portions such that the membrane 22 bulges towards the portion 16 and takes on a shape as near as possible that of a section of a sphere. The membrane is very thin, being formed, for example, of 0.0001 inch thick Mylar, which is silvered or aluminized on the surface facing chamber portion 18 to make it highly reflecting. The membrane is so thin that it moves substantially exactly with the water. The characteristic sought for the membrane 22 is a nearly ideal ability to move with and follow the motions of the fluid surrounding it such that acoustic pressure waves in the fluid 24 affect the membrane as though it were a thin section of the fluid itself.

Positioned on the optical axis 34 of the spherical membrane 22 is an acoustically reflecting and light transmitting prism 36 having a face 38 inclined at approximately 45° to the axis 34, the inclined face 38 serving to reflect shock waves from a pulse generator 40 (to be described in detail later) toward the membrane 22 and the body 26 along the axis 34. The prism 36 has a plane surface 42 orthogonal to the axis 34 and facing outwardly from the chamber.

The pulse generator 40, as will be explained more completely below, generates a single, high intensity, short duration pure pressure pulse, or shock wave, originating from a point 44, which is a virtual image of the center of the sphere of which membrane 22 is a section. The shock wave is reflected from surface 38, penetrates through the membrane into chamber portion 16, which contains the object of investigation, for example, a human body. At a certain time following initiation, the shock wave reaches a selected section of the body, indicated by the dashline 98, and a certain time interval later the wavelets returned from this section (which need not be exactly spherical) return to the membrane 22 and in passing therethrough causes it to deform. An important feature of the present invention is that the equivalent of a sound hologram is obtained, not by the interference of monochromatic waves as in the case of conventional holograms, but by illuminating the membrane 22 with light pulses at a high repetition frequency, the deformations of the membrane caused by the sharp echo pulse being viewed repeatedly by the light flashes, thereby to make it appear as if it had been a continuous wave oscillation.

Figures 2A, 2B:
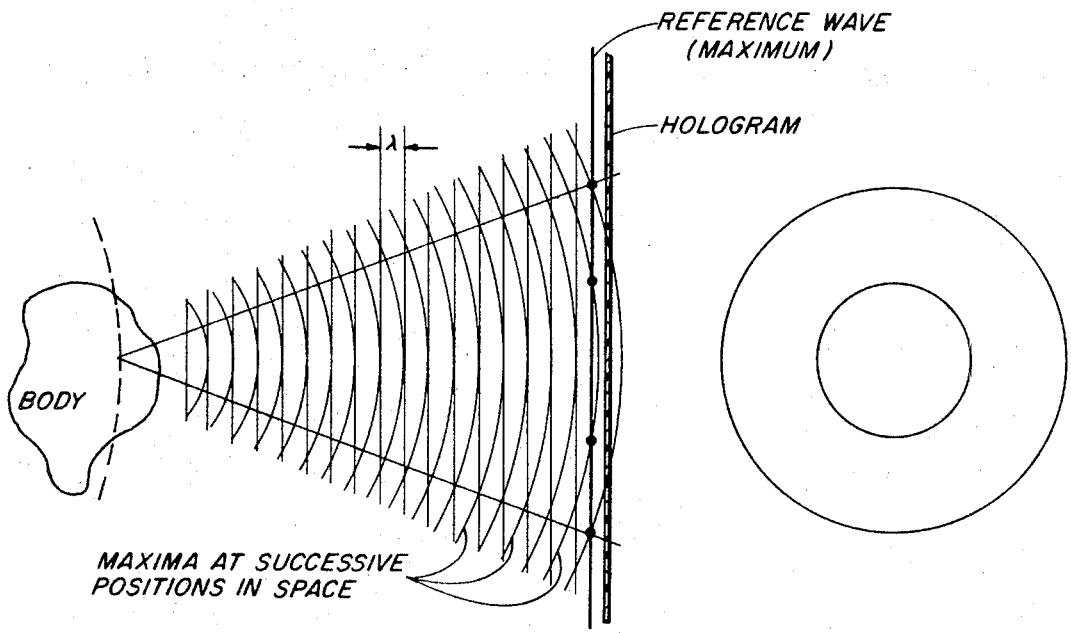
FIGS. 2A – 2D are diagrams useful in explaining how the equivalent of a hologram is produced on the membrane in the system of FIG. 1.

How the equivalent of a hologram is obtained will be better understood from a comparison of the mechanism by which conventional holograms are produced and the technique herein utilized, with the aid of the diagrams of FIGS. 2A, 2B, 2C and 2D. Referring first to FIG. 2A, which illustrates the construction of a hologram with continuous wave radiation, the hologram is produced by illuminating a photographic film, for example, by a reference wave of coherent radiation (shown as having a plane wavefront) and an object wave of the same frequency reflected from a point of an object being examined. The lines depicting the two waves represent their maxima at successive positions in space, being spaced by one wavelength. At the points on the film where the two waves interfere, indicated by the dots, a zone plate (hologram) of the point in the body is produced, composed (in this very schematic example) of two concentric rings, shown in plan view in FIG. 2B.

Figures 2C, 2D:
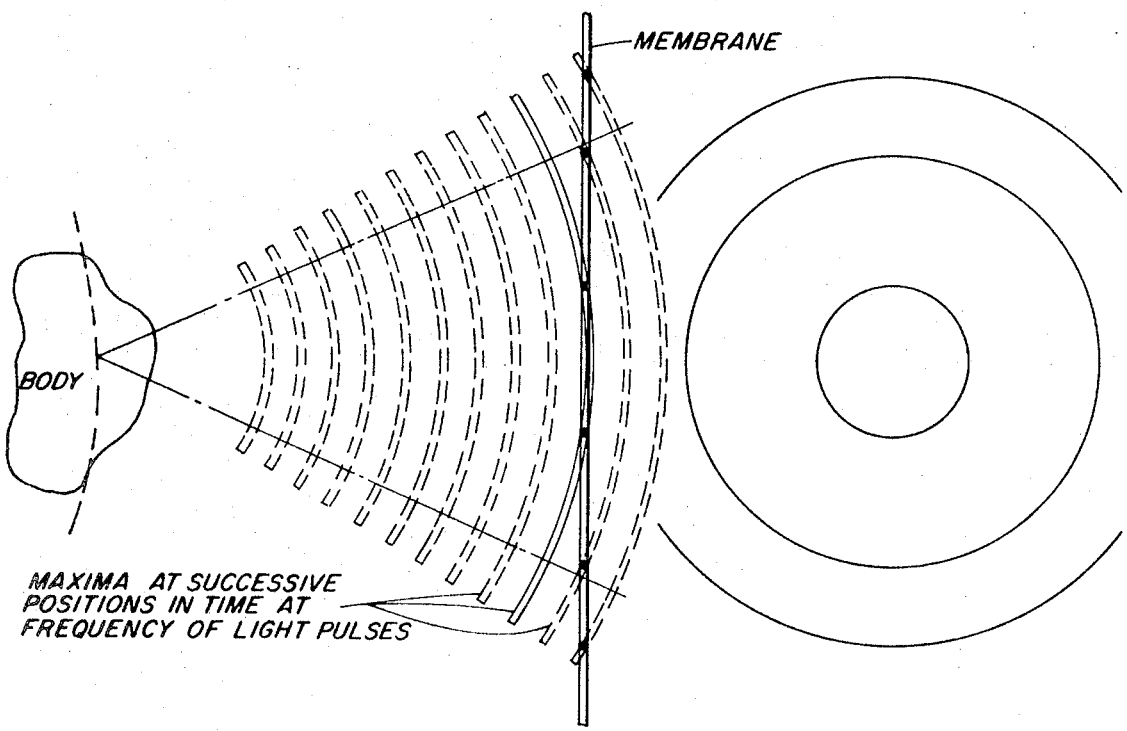

In the present sonoradiography system, schematically illustrated in FIG. 2C, the "object" beam is not continuous wave radiation, but, rather, is a shock wave of finite duration, corresponding essentially to the duration of the sharp pulse produced by generator 40, which propagates from the object through the liquid medium at a predetermined velocity, about 1500 m/sec. for water, and consequently assumes successive positions in time represented by the curved wavefronts shown in dotted lines. For reasons which will shortly appear, the spacing between successive positions of the wave corresponds to the intervals between successive light pulses (preferably from a laser) with which the membrane is illuminated. As the wave passes through the membrane at points further and further outwardly from the center of the wave, and because of the finite thickness of the membrane (albeit very thin) and the finite velocity of propagation, a finite time is required for each elemental portion of the wave to transverse the membrane. The surface of the membrane opposite the body is illuminated by a beam of laser light pulsed at a high frequency, of the order of 1 Mhz. The duration of the light flashes is approximately equal to the time during which it takes an elemental portion of the returning sound wave to traverse the membrane. The periodic illumination produces on the membrane, due to reflections of the light from the deformations on the membrane, the appearance of a system of Fresnel zones, represented by the dots in FIG. 2C and the concentric rings in the plan view of FIG. 2D; that is to say, the same pattern as is produced by the point scatterer in the hologram of FIGS. 2A and 2B. The whole pattern on the membrane is, therefore, the simulation of a hologram, which would have been obtained with holographic techniques using a continuous-wave frequency corresponding to the pulse repetition frequency of the light pulses.

Reverting to FIG. 1, the membrane 22 is illuminated with a laser beam 46 from a laser 48 which passes through a light modulator 50 which is operative to vary the intensity of the light from a maximum to a near zero value at a high frequency. As indicated above, the pulse repetition frequency is preferably of the order of 1 Mhz, and the duration of the individual light flashes approximate the finite time required for an elemental portion of the sound wave returned from the object 26 to traverse membrane 22. The beam of pulsed light from modulator 50 is expanded through a lens-pinhole system 52, and is further brought to a focus by the converging lens 54 which reconverges the laser beam through a grating 56 to the center of an imaging lens 58. Light from the lens 58 passes through a beam-splitter 60 onto the surface 42 of the prism 36, it being noted that the optical axis 34 passes through the beam-splitter 60 and the center of lenses 58, 54 and 52 and the grating 56. Light passing through the prism 36 is directed toward the membrane 22 as spherical wave-fronts concentric with the curvature of the membrane, the placement of lenses 52 and 54 being such to insure this concentric condition. The lens 58 images the pattern of grating 56 onto the membrane 22 as a series of closely spaced parallel lines.

For reasons which will appear hereinafter, the grating 56 is mounted on a shaft 64 comprising part of a linear positioning mechanism 66 which is operative to selectively withdraw the grating from the path of radiation between the lenses 54 and 58 and to insert in its place an optical blank 62. The positioning mechanism 66 is actuated in response to a signal applied thereto from a sequencer 68, additional functions of which will become evident as the description proceeds.

Light reflected from the membrane 22 is returned as converging concentric wavefronts with small deviations produced by imperfections of the membrane 22 and deformations produced by the pressure pulse traversing the membrane. The returning light passes through the prism 36 and is reflected by the beam-splitter 60, which is disposed at an angle of substantially 45° to the optical axis 34, through a correcting hologram 74 and a schlieren stop 72 toward a camera 70. Light passing the schlieren stop 72 passes through the camera optics 80 and strikes a photosensitive film 82 on which it produces a photographic record of the simulated hologram appearing on the membrane 22. A shutter 76 adapted to be selectively positioned in and out of the radiation path by a shutter mechanism 78 under control of the sequencer 68, is interposed between the correcting hologram and the schlieren stop.

Since the small deformations of the membrane 22 caused by the acoustical pulse may be of the same magnitude, or even smaller, than imperfections in the membrane itself, it is necessary, and it is an important feature of the present invention, to compensate for these imperfections in order to detect the deformations. This is accomplished by the correcting hologram 74, the function of which is to produce a perfect spherical wave when illuminated by the laser light reflected from the membrane 22 in its acoustically undisturbed state, preferably just before it is insonified by the pulse returning from the body under examination. Under these conditions, the light reflected from the membrane will come to a perfect diffraction-limited focus on the schlieren stop 72. The small deformations of the membrane caused by the return wave will thus be observable under the best possible schlieren detection conditions.

The manner in which a perfectly spherical wave may be detected from an imperfect membrane by means of the correcting hologram will now be described. The correcting hologram is recorded by interference between the light reflected by the imperfect membrane on the one hand, and on the other, light reflected from a perfect spherical mirror used as a reference. Accordingly, when the hologram is illuminated with the light reflected from the imperfect acoustically undisturbed membrane it will reconstruct the perfect spherical wave. When the ultrasonic pulse waves returning from the body now traverse the membrane, the small deformations of the imperfect membrane caused by the return waves will be observed as if they had been deformations on a perfectly spherical membrane.

For the recording of the correcting hologram 74, the blank 62 is brought into the illuminating laser beam and the shutter 88 is removed by a suitable actuating mechanism 90, both under control of sequencer 68, so that light may reach a perfect spherical mirror 86. The laser light having gone through the blank 62 is brought to focus by lens 58 at the center of curvature of the spherical mirror 86 as seen through the beam-splitter 60. The focus produced by lens 58 is also as close as possible to the approximate center of the essentially spherical membrane 22 as seen through the beam-splitter and prism 36. An unexposed photographic or photochromic plate 74 is placed near the common center of the mirror 86 and membrane 22, as produced by the laser beam reflected from them, its position being essentially normal to the optical axis 84 and closer to the mirror 86 on that axis than the common center, which is focused on the schlieren stop 72 through the beam-splitter 60 and the holographic plate 74. Under these conditions, the exposure of the photosensitive plate 74 will be the hologram of the perfect spherical wave $S_1$ reflected from mirror 86 with the imperfect spherical wave $S_2$ reflected from the membrane 22 used as the reference beam. During recording of the correcting hologram, shutter 76 is closed to prevent light from reaching the photographic plate 82 in the camera. The correcting hologram is preferably recorded immediately before initiation of the ultrasonic pulse wave from source 40, and accordingly is usually recorded on a photochromic medium.

To further clarify the function and operation of the correcting hologram, consider first the case where laser light is reflected from the imperfect membrane 22 still undisturbed by returned ultrasonic pulse waves. At this point in the sequence, shutter 88 is closed so that no light is reflected from mirror 86 and shutter 76 is open so that light may reach the schlieren stop 72 and go onto the photographic plate 82. Under these conditions, illumination of the hologram by light reflected from the imperfect membrane 22 will reconstruct the perfectly spherical wave $S_1$ and that wave will come to a perfect diffraction-limited focus on the schlieren stop 72 and, therefore, no light will reach the photographic plate 82 past the schlieren stop. When, however, the pulse wave traverses the imperfect membrane 22, causing the above-described Fresnel zone-like disturbances on it, these disturbances will be observed by means of the schlieren system, as compensated by the correcting hologram 74, as if the deformations had in fact beeen produced on a perfectly spherical membrane. Thus, when the membrane is periodically illuminated as discussed above, the record on plate 82 of the camera is a photographic representation of the simulated acoustical hologram obtained on the membrane 22.

The above-outlined sequence of operations of the various shutters may be initiated by a hydrophone 92 placed at a desired position, shown as adjacent the inner edge of the diaphragm 20, to detect the passage of the pressure pulse from the generator 40. The signal developed by the hydrophone is applied through a pulse delay circuit 94 to the sequencer 68 to initiate a predetermined sequence of operations.

In operation, an ultrasound pressure pulse generated by pulse generator 40, and emanating substantially from a point source 44 with spherical wave fronts, is reflected by the inclined surface 38 of prism 36 and directed to and through the membrane 22 to strike the body 26, the membrane causing insignificant distortion to the pressure pulse as it passes therethrough. Ultrasound energy reflected from the body 26 travels back to the membrane 22 as wavelets which cause deformations at any given instant of time representative of the structure of the body 26 along a given section line, such as section 98 in FIG. 1. Reflected energy is also detected by hydrophone 92 which provides a signal to sequencer 68, and by appropriate adjustment of the delay interval of delay unit 94, the sequencer can be caused to commence the series of control functions which result in recording on the photographic plate 82 a pattern representative of the structure within the body 26 at the selected section.

The sequencer 68, in response to a start signal, initiates the following operations in the indicated sequence within a period of approximately 1/10th of a second:

1. Controller 66 is activated to interpose optical blank 62, rather than grating 56, in the radiation path between the lenses 54 and 58. The blank 60 has no optical function other than to compensate the light path for the thickness of the removed grating 56. The shutter 72 is closed and maintained in that condition by the controller 78, and shutter 88 is opened by controller 90. With all these conditions established, the laser 48 is activated and the modulator 50 placed in condition to transmit light for a predetermined interval of illumination, which depends upon the optical transmissivity of the radiation path and the sensitivity of the photochromic material used for exposure of the correcting hologram 74. The correcting hologram is recorded by interference between the light reflected by the imperfect membrane 22 and light reflected from the near perfect spherical surface of the mirror 86 used as a reference. Accordingly, when the hologram is subsequently illuminated with light reflected from the imperfect acoustically undisturbed membrane, it will reconstruct the perfect spherical wave produced by the mirror.

2. With the conditions the same as stated in paragraph 1 except that shutter 88 is closed and shutter 76 opened, the laser 48 is again activated for a predetermined interval, of the order of 1/20th of a second, depending upon the sensitivity of the photochromic material forming the schlieren stop 72 and the transmissivity of the optical path for the laser radiation. The photochromic material on the schlieren stop 72 is placed at the focal point for the radiation reflected from membrane 22 and beam-splitter 60 whereby the photochromic material is exposed to produce a visible pattern representative of the shape of the membrane 22 in its acoustically undisturbed state just prior to the generation of a pulse by the generator 40.

3. With conditions the same as stated in paragraph 2, except that the grating 56 is moved into position between the lenses 54 and 58, a pulse is generated by the generator 40, preferably in response to a signal from sequencer 68. The echo pulses from the body 26, after passing through membrane 22 are detected by hydrophone 92 and delayed in the delay unit 94 by a predetermined amount and applied to sequencer 68 which, in turn, activates the laser 48 and modulator 50. At the same time, a shutter within camera 70 is activated so that the film 82 may be exposed to radiation reflected by membrane 22. The radiation passing through the correcting hologram 74 and past the schlieren stop 72 is a photographic representation of the simulated acoustical hologram obtained on the membrane 22 in the manner described in detail earlier. The corrugations of grating 56 as imaged upon the reflecting surface of membrane 22 produce a modulation effect which enhances the phase differences in the light reflected from the membrane by converting them into more easily detected amplitude differenes.

Figure 3A:
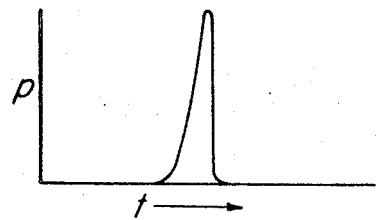
FIGS. 3A – 3C are waveform and wavefront diagrams useful in explaining the operation of the invention.
Figure 3B:
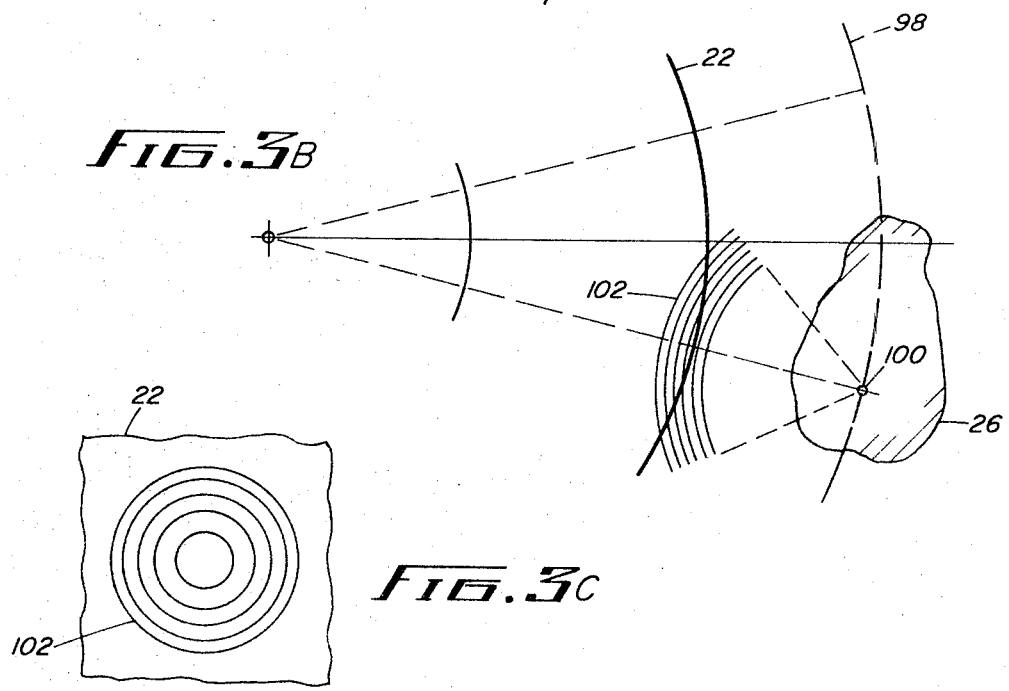
Figure 3C:
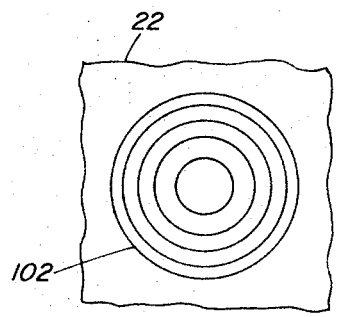

Referring now to FIGS. 3A-3C, and recalling the discussion of FIGS. 2A-2D, the cooperation between the single, high-intensity, short duration pressure pulse from generator 40 and the modulated light from modulator 50 to produce a simulated hologram on the surface of the membrane will now be considered. FIG. 3A represents a typical pressure-time waveform of the single pressure pulse, and FIG. 3B depicts this pulse as reflected from a point 100 on the selected section 98 of the body 26 under examination. The sound echos returning from the point 100 at time intervals corresponding to the peak transmissivity of light modulator 50 are indicated in FIG. 3 by the plurality of wavefronts 102 (which were shown in larger scale in FIG. 2C). As described earlier, the wavefronts 102 appear as Fresnel rings or plates, as shown in FIG. 3C, as the deformations caused by reflected wavefronts passing through the membrane are illuminated at precise intervals by the modulator 50. These intervals are selected to approximate the time it takes a given wavelet to pass through the membrane 22, although other intervals may be used.

Figure 4A:
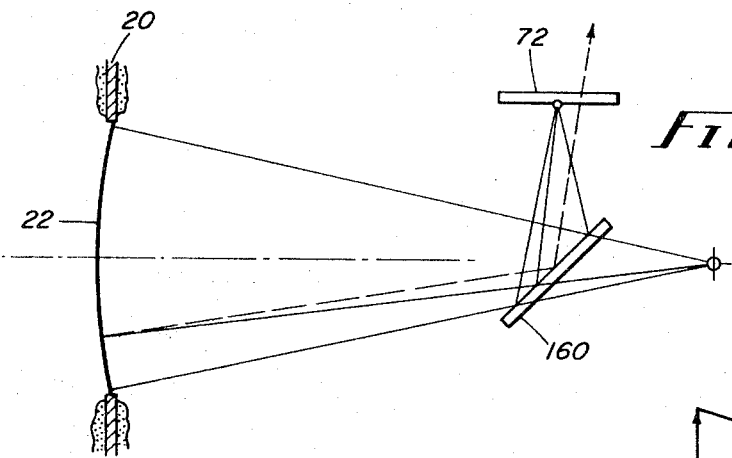
FIGS. 4A and 4B are optical and vector diagrams, respectively, useful in explaining the operation of the schlieren stop.
Figure 4B:
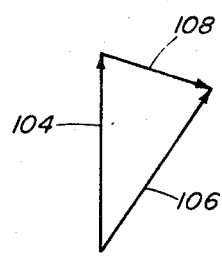

The operation of the schlieren stop 72 will be better understood by reference to FIGS. 4A and 4B. In FIG. 4A, the membrane 22 is assumed to be perfectly spherical (which is essentially the situation whe the corrective action of correcting hologram is taken into account) with the consequence that radiation reflected from membrane 22 and from beam-splitter 60 will be focused to a very small spot on the photochromic surface of the schlieren stop 72. The exposed dot produces a visual opaqueness on the stop 72 which has the effect of a knife-edge in the conventional schlieren stop technique. The purpose of this dot is to product characteristics in the radiation passing the schlieren stop 72 which is representative of subsequent distortion of membrane 22.

FIG. 4B is a phasor plot illustrating the function of schlieren stop 72, the vector 104 representing the intensity and phase of radiation which produced the exposed spot on the schlieren stop. This vector is suppressed by the operation of the schlieren stop, but when the membrane 22 is slightly deformed, the reflected radiation is either advanced or retarded in phase to produce the reflected radiation vector 106. The vector 104 is subtracted from vector 106 to produce the difference vector 108, this representing the radiation passed by the schlieren stop and reaching the camera 70.

Figure 5A:
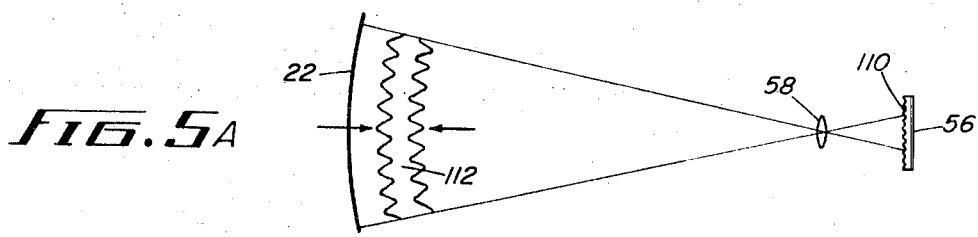
FIGS. 5A and 5B are respectively wavefront and vector diagrams useful in explaining the sensitivity enhancing features of the invention.
Figure 5B:
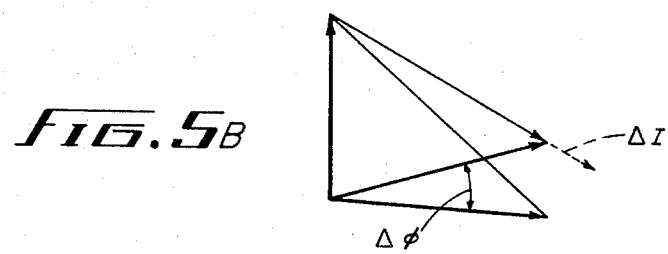

The square of the difference vector 108 is what is received at the photographic plate of the camera as representative of the amplitude of the deformation; this square-law characteristic tends to de-emphasize small difference vectors, a serious disadvantage of the schlieren stop technique. In accordance with another aspect of the present invention, the modulation of the illuminating light by grating 56 operates to compensate for this de-emphasis, as will be seen by reference to FIGS. 5A and 5B. In FIG. 5A the grating 56 is shown to have a plurality of lines or Fresnel edges 110 which, when imaged through lens 58, produce a modulation of the intensity of the wavefronts 112 as they approach the membrane 22. This modulation or "crinkling" is such as to produce a peak-to-peak phase difference in the wavefront every half wavelength of the laser radiation. As a result of this wavefront modulation, a small bend or deformation in the membrane will add in one phase direction during one-half of a wavelength, and add at a 180° different phase during the other half of the wavelength of the incident radiation, thereby resulting in a ±90° variation in the maxima of the incident radiation. The maxima intensities are resultingly amplitude modulated by the membrane, which, for example, in the case of a membrane deformation of 1/100th of a radian, results in an intensity variation of ±2 percent. The effect is somewhat similar to holography where a reference wave and an object wave are combined, and the reference wave modulates the object wave by phase cancellation and reinforcement effects. It is preferable to make the distance between adjacent maxima in the radiation incident on the membrane somewhat shorter than the shortest spacing between fringes which are visible without the modulation. Being optically controlled, this is readily achieveable.

Figure 6:
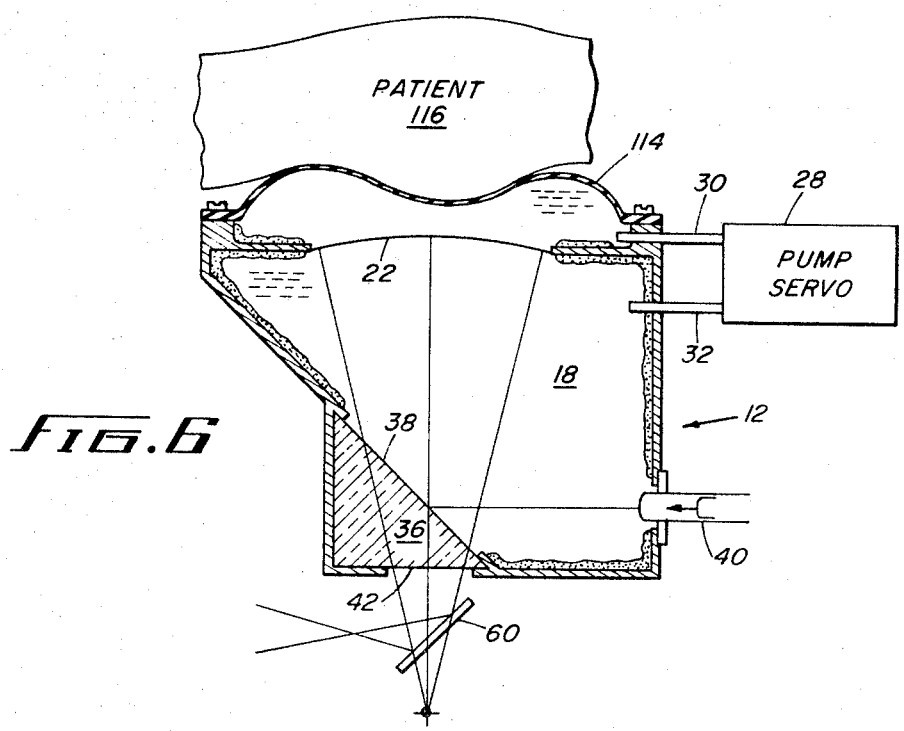
FIG. 6 is a cross-sectional view illustrating another form of a portion of the system of FIG. 1 useful for the investigation of internal tissue conditions of a human patient.

An alternative implementation of the system of FIG. 1 is illustrated in FIG. 6, and is of particular utility in the investigation of human patients. The optical system is the same as in FIG. 1, and in place of the chamber portion 16 there is provided a smaller fluid-filled cushion 114 on which the patient rests. The patient being in intimate contact with the top of the cushion, which may be formed from a flexible plastic bag, there is a relatively low reflectivity barrier between the patient 116 and the fluid cushion. The pump servo 28 and connecting ports 30 and 32 maintains the membrane 22 substantially spherical as patient pressure is applied to the cushion. It should be noted that in the case of water as the fluid medium in the chamber 12, its exceptionally low compressibility aids in maintaining the spherical shape of the membrane 22.

Figure 7:
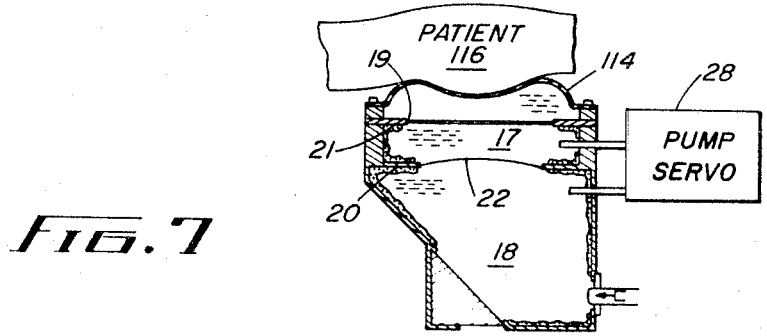
FIG. 7 is a fragmentary elevation cross-sectional view illustrating another alternative construction of a portion of the system of FIG. 1.

Alternatively, in the interest of isolating the membrane 22 from pressure differentials caused by the body under examination (e.g., due to breathing of the patient) it may be desirable to interpose another acoustically transparent partition between the body and the membrane, as shown by the fragmentary illustration in FIG. 7 of a portion of FIG. 1. In this arrangement, which is similar to the implementation of FIG. 6, a second window-like membrane 21 covers an opening in a second diaphram 19 and with membrane 22 defines an isolating chamber portion 17 between the body to be examined and the membrane 22. The membrane 21 is mechanically quite solid, like "Plexiglas", which acoustically, is quite transparent. Chamber portions 17 and 18 are filled with the same liquid medium, for example, water, and a fluid pump 28 connected between the chamber portions maintains the proper pressure differential between them to cause membrane 22 to take a shape approaching that of a section of a sphere. The patient, instead of being immersed in the liquid as in the arrangement of FIG. 1, rests on a water cushion 114 formed from a flexible plastic bag, for example.

Figure 8:
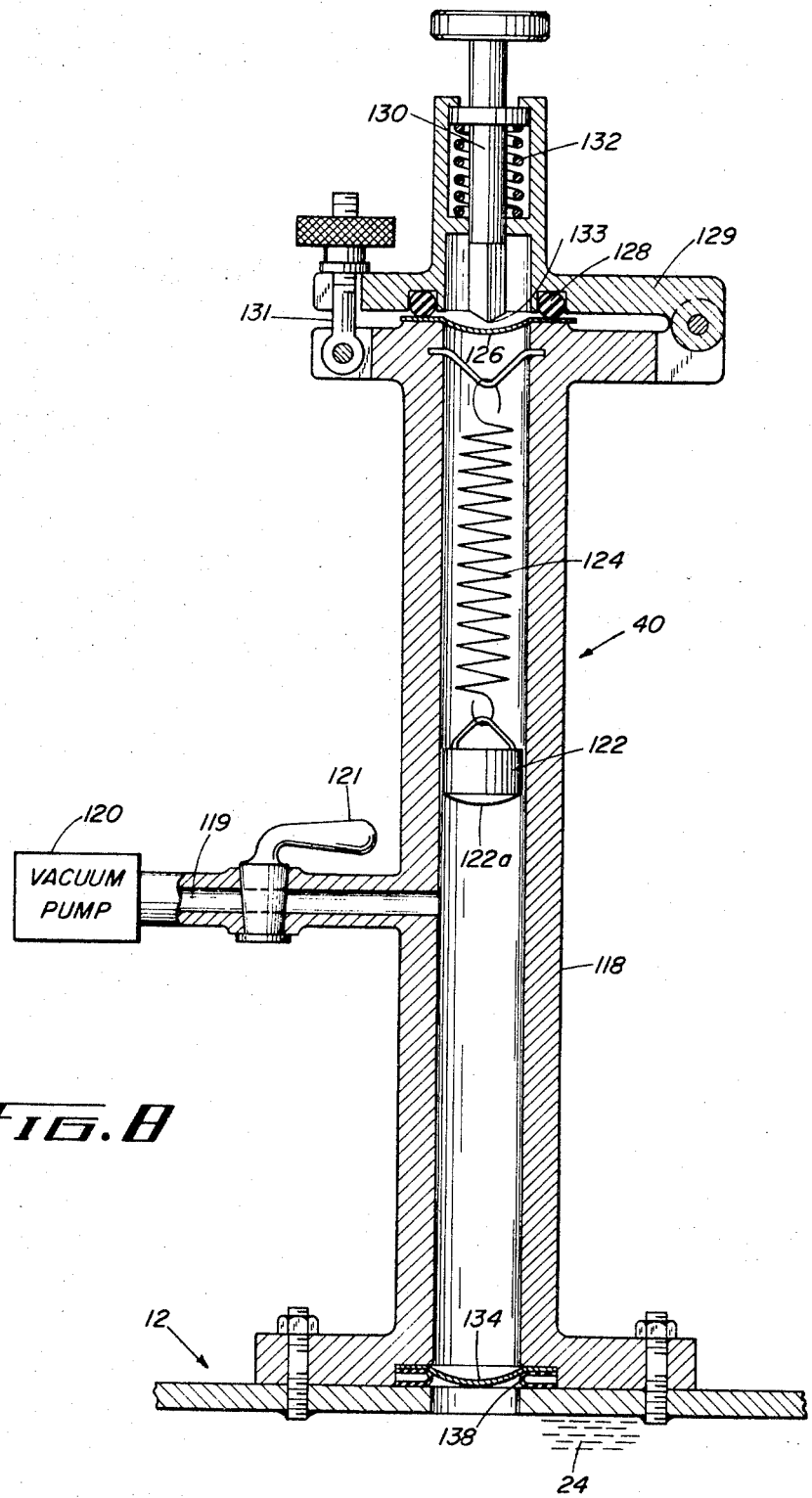
FIG. 8 is an elevation cross-section of a pressure impulse generator used in the system of FIGS. 1 6 and 7.

Another novel aspect of the present invention is the means for generating the single, high-intensity short duration pressure pulse, shown in elevation cross-section in FIG. 8. The pulse generator 40 is secured to the wall of chamber 12, as by a plurality of bolts, two of which are seen in the illustration. Alternatively, the assembly 40 may be hinged at one side to permit the assembly to be tipped relative to the chamber for ready access to the bottom of the tube for replacement of certain parts therein which may be damaged or destroyed during operation of the generator. The generator generally comprises a cylindrical tube 118 having a central bore extending throughout its length and which communicates via a conduit 119, closeable by a shutoff valve 121, to a vacuum pump 120, whereby the bore may be evacuated. Disposed within the bore is a piston 122, preferably in the form of an aluminum thimble having a thin wall and a spherical face 122a having a thickness of approximately .008 inch. The thimble 122 is suspended on a light spring 124. The opening at the distal end of the bore in tube 118 is covered with a cellophane membrane 126 having a thickness in the range of 0.0005 to 0.001 inch thick which is sealed around its periphery by a rubber gasket or "O"-ring 128. The "O"-ring is urged into contact with the cellophane membrane by a cap member 129 which is pivoted at one side and adapted to be tightened down onto the end surface of tube 118 by a toggle and thumb screw arrangement 131. A perforator punch 130 is slidably positioned within the cap member 129, coaxially with the bore in the tube 118, being maintained in its extended position by a coil spring 132. As illustrated, the punch is actuable manually, but in the system of FIG. 1 would preferably be operated magnetically in response to a signal from sequencer 68 to cause the sharp end 133 of the punch to puncture the membrane 126.

In operation, the tube 118 is first sealed by a fresh cellophane member 126 and then evacuated. The punch 130 is impelled to puncture the membrane 126, whereupon the vacuum is lost and air enters the bore. The sudden increase in air pressure accelerates the aluminum thimble 122 down to the lower end of the bore, the distance from its rest position to the lower end being about 10 centimeters. Over this distance the thimble acquires an energy of one joule per square centimeter and at the end of its passage physically impacts an aluminum membrane 134 of approximately the same thickness as thimble 122 and of a spherical shape to match the thimble face 122a. The membrane 134 interfaces with the fluid 24 contained within chamber 12; a rubber gasket 138 positioned between the outer wall of chamber 12 and the membrane 134 prevents the latter from being sheared off by the impact of the thimble. Upon impact of the thimble on the aluminum membrane 134, the energy of the thimble is transmitted to the membrane and consequently to the fluid 24, the velocity of the wavefront being equal to the final velocity of the thimble. For the dimensions indicated, the depth of the wavefront at the initiation of the pulse is only 2.7 times the thickness of the aluminum membrane, this factor arising from the specific weight ratio of aluminum to water, and the principles of momentum exchange requiring that the moving mass of the fluid 24 is equal to the mass of membrane 134. The sound generator produces a spherical wavefront at an angle wider than the angle subtended by the aluminum membrane 134. The initial energy is about two joules, and this distributed over, for example, a thousand square centimeters, gives an intensity of one to two millijoules per square centimeter; as little as one part in one hundred million of this energy returning from a section of the body is sufficient to produce an optical record when the above-described techniques are employed.

Having described embodiments of the invention, other modifications and alternatives which may be implemented without departing from the spirit of the invention will now be evident to ones skilled in the art. Fro example, although the operation of the invention has been described in terms of reflected ultrasound waves, by placing the pulse generator at a point on the opposite side of the body from the membrane 22 it is possible to detect refracted rather than reflected ultrasound energy for investigating the body. It will be understood that the length of time during which the laser 48 and modulator 50 are activated and the corresponding length of the exposure on the film 82, determines the thickness of the selected section 98 which is to be viewed. Accordingly, it is possible to provide on the film 82 an image pattern representative of structure throughout the entire body 26 from front to back, though certain depth distortions known in the art will result. Thus, it is generally preferable to select a relatively shallow section for investigation, and if an investigation of greater depth is required, several shallow sections of varying depth can be exposed. It is accordingly intended to limit the scope of the invention only as indicated in the following claims.

I claim:

1. Apparatus for producing on a recording surface an optically detectable pattern representing the response of a body to ultrasonic stimulation, comprising:
   a chamber containing a fluid medium having low compressibility;
   a thin membrane separating said chamber into first and second portions and taking generally a spherical shape in response to pressure differentials between said first and second portions, said membrane having an optically reflective surface on the concave side thereof;
   said body being positioned to interface with said fluid medium;
   means acoustically coupled to said chamber for generating a short duration, high amplitude, ultrasound pressure pulse;
   means for directing said pulse toward said body whereby reflections and scattering of said impulse by said body produce ultrasound echo pulses operative to deform said membrane;
   a source of coherent light;
   means for directing said coherent light toward the reflective surface of said membrane as spherical wave-fronts;
   means for modulating said coherent light to produce periodic pulses having durations approaching the transit time of ultrasound echo pulses through said membrane;
   a light-sensitive recording surface;
   means for directing light reflected from said membrane toward said reflecting surface;
   a correcting hologram interposed in the path of light reflected toward said recording surface for masking the effects of deviations of said membrane from spherical shape; and
   means including a schlieren stop interposed between said correcting hologram and said recording surface for masking the sharply focused light remaining after correction by said correcting hologram.

2. Apparatus according to claim 1 wherein said ultrasonic pulse generating means includes:
   a tube having a cylindrical bore removably secured to said chamber;
   a membrane closing one end of said bore and interfacing with the liquid medium in said chamber;
   a plunger within said bore having a surface essentially matching that of said membrane in shape and thickness; and
   means for impelling said plunger toward said membrane with a predetermined speed.

3. Apparatus according to claim 2 wherein said membrane closing one end of said bore has a generally spherical shape and is formed of a light-weight material to minimize the duration of the generated pulse.

4. Apparatus according to claim 1 further including:
   a near perfect spherical mirror positioned to be selectively illuminated by light from said laser, and wherein
   said correcting hologram is exposed on a photochromic medium a short interval before the generation of said pressure pulse and is produced by interference between coherent light reflected from said membrane while in an acoustically undisturbed state and coherent light reflected from said mirror.

5. Apparatus according to claim 4 wherein said schlieren stop is exposed on a photochromic medium just prior to the generation of said pressure pulse and subsequent to the exposure of said correcting hologram.

6. Apparatus according to claim 5 further including an optical grating arranged to be positioned in the light path from said laser to said membrane for modifying the spherical wavefronts of light incident on said membrane.

* * * * *